(No Model.)

J. J. SCHILLINGER.
MIXING OR STIRRING VESSEL.

No. 429,484. Patented June 3, 1890.

WITNESSES:
Edward Wolff
William Miller

INVENTOR:
John J. Schillinger.
BY
Van Santvoord & Hauff
his ATTORNEYS

UNITED STATES PATENT OFFICE.

JOHN J. SCHILLINGER, OF NEW YORK, N. Y.

MIXING OR STIRRING VESSEL.

SPECIFICATION forming part of Letters Patent No. 429,484, dated June 3, 1890.

Application filed April 11, 1890. Serial No. 347,517. (No model.)

*To all whom it may concern:*

Be it known that I, JOHN J. SCHILLINGER, a citizen of the United States, residing at New York, in the county and State of New York, have invented new and useful Improvements in Mixing or Stirring Vessels, of which the following is a specification.

This invention relates to a vessel or receptacle in which substances can be readily stirred or mixed; and the invention consists in the details of construction set forth in the following specification and claims, and illustrated in the accompanying drawings, in which—

Figure 1:
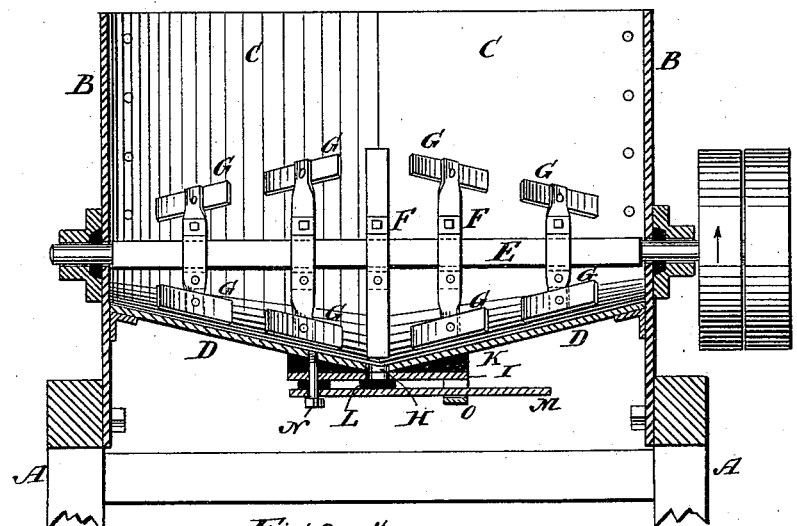
Figure 2:
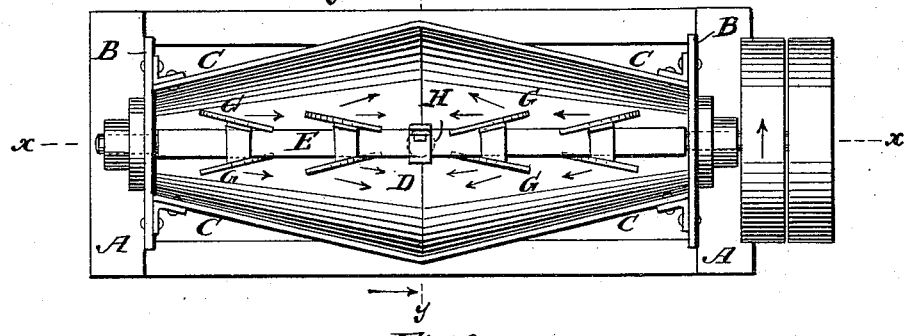
Figure 3:
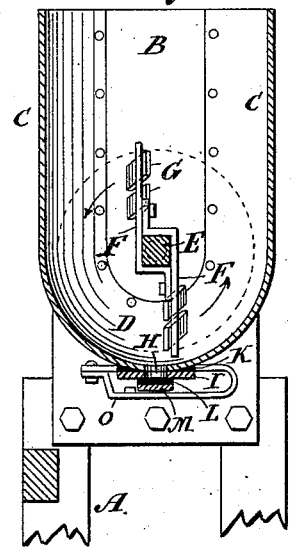

Figure 1 is a longitudinal section along $x$ $x$, Fig. 2. Fig. 2 is a plan view of a mixing or stirring vessel. Fig. 3 is a section along $y$ $y$, Fig. 2.

In the drawings, the letter A indicates a frame or support.

B B are the ends or edges of the vessel. C C the sides, and D the bottom. The sides B are inclined from the edges outward toward the center of the vessel. The bottom D is inclined from the edges downward.

In the vessel is a shaft E, to which motion can be imparted by suitable means, such as a pulley. The shaft carries stirrers or arms F. Inclined or deflecting blades G are shown secured to the arms. The arms gradually increase in length from the edges inward to accommodate themselves to the gradually-increasing capacity of the vessel. The inclined blades and gradually-lengthening arms F cause a thorough stirring and mixing of the contents of the vessel, since such contents are driven from the edges of the vessel inward and then pass or flow back again toward the edges.

The bottom of the vessel has a central outlet-orifice H at the junction of the oppositely-inclined bottoms D. A packing-plate I, provided with an opening corresponding to the outlet H, is secured to the bottom D. A packing K is secured between the packing-plate and the bottom. A plug or stopper L closes the outlet H. Said stopper has an actuating-handle M swinging about the joint or pivot N, so that the stopper can be readily withdrawn from the outlet when any of the contents of the vessel are to be drawn off. A guide O may be provided to steady the handle M in its movements.

I have found this vessel serviceable in such work as making articles from plaster, gypsum, or cement, since the stirrers and blades in the vessel will prevent the gypsum or cement from becoming hard or set until after the same has been withdrawn through outlet H and applied to its intended use, such as making composite or cement blocks or partitions for building purposes. The shaft E has its ends properly packed, so that no leakage occurs about the shaft.

What I claim as new, and desire to secure by Letters Patent, is—

1. The combination of a vessel having its sides inclined from the edges outward toward the center and provided with oppositely-inclined bottom walls having a discharge-orifice at or near their junction, means for opening and closing the discharge-orifice, and a shaft located in the vessel and provided with gradually-lengthening stirring-arms, substantially as described.

2. The combination of a vessel having its sides inclined from the edges outward toward the center and provided in its bottom wall with a discharge-orifice, means for opening and closing the discharge-orifice, and a shaft located in the vessel and having stirring-arms provided with angularly-arranged deflecting-blades, substantially as described.

3. The combination, with a vessel having its sides and bottom walls inclined from the edges outward toward the center, of a rotary shaft located in the vessel and having gradually-lengthening arms provided with angularly-arranged deflecting-blades, substantially as described.

4. The combination of the vessel having its bottom inclined downward toward the center and provided with a discharge-orifice at or near such center, a packing surrounding the discharge-orifice in the inclined bottom wall, a plate securing the packing, a movable stopper or plug for the discharge-orifice, and a shaft located in the vessel and having stirring-arms, substantially as described.

In testimony whereof I have hereunto set my hand in the presence of two subscribing witnesses.

JOHN J. SCHILLINGER.

Witnesses:
WM. C. HAUFF,
JAMES L. NORRIS.